United States Patent

[11] 3,566,999

| | | |
|---|---|---|
| [72] | Inventor | Donovan L. Robinson<br>Indianapolis, Ind. |
| [21] | Appl. No. | 840,371 |
| [22] | Filed | July 9, 1969 |
| [45] | Patented | Mar. 2, 1971 |
| [73] | Assignee | General Motors Corporation<br>Detroit, Mich. |

[54] FLUID COOLING SYSTEM
8 Claims, 2 Drawing Figs.

[52] U.S. Cl. .................................................... 192/3.28,
60/54, 74/732, 192/113, 184/6
[51] Int. Cl. .................................................... F16d 33/00,
F16d 13/72, F16d 13/74
[50] Field of Search .................................................... 60/54;
74/732; 192/3.27, 3.28, 3.29, 3.3, 3.31, 113 (.2);
184/6 (U)

[56] References Cited
UNITED STATES PATENTS

| 2,640,572 | 6/1953 | O'Brien | 192/3.28(X) |
|---|---|---|---|
| 2,889,718 | 6/1959 | Schjolin et al. | 74/732 |
| 3,005,359 | 10/1961 | Ahlen | 74/732 |
| 3,151,718 | 10/1964 | Temple | 74/732(X) |
| 3,326,338 | 6/1967 | Mattli | 192/3.3 |

*Primary Examiner*—Allan D. Hermann
*Attorneys*—Warren E. Finken, A. M. Heiter and John P. Moran

ABSTRACT: A transmission having a torque-converter drive and an alternate mechanical drive between the transmission input and output members where the torque converter, during drive operation, provides a centrifugal pressure head between the fluid inlet to the operating chamber and the fluid outlet from the operating chamber for the circulation of the torque converter operating fluid through the labyrinth path of a heat exchanger. The makeup fluid for the torque converter is connected to the central portion of the path of the heat exchanger so that during torque converter operation the makeup fluid flows with the circulating torque converter operating fluid through the latter portion of the heat exchanger labyrinth path, and during direct drive operation when the torque converter is not operating and creating a pressure head, the makeup fluid flows through both halves of the path of the heat exchanger to the torque-converter exhaust.

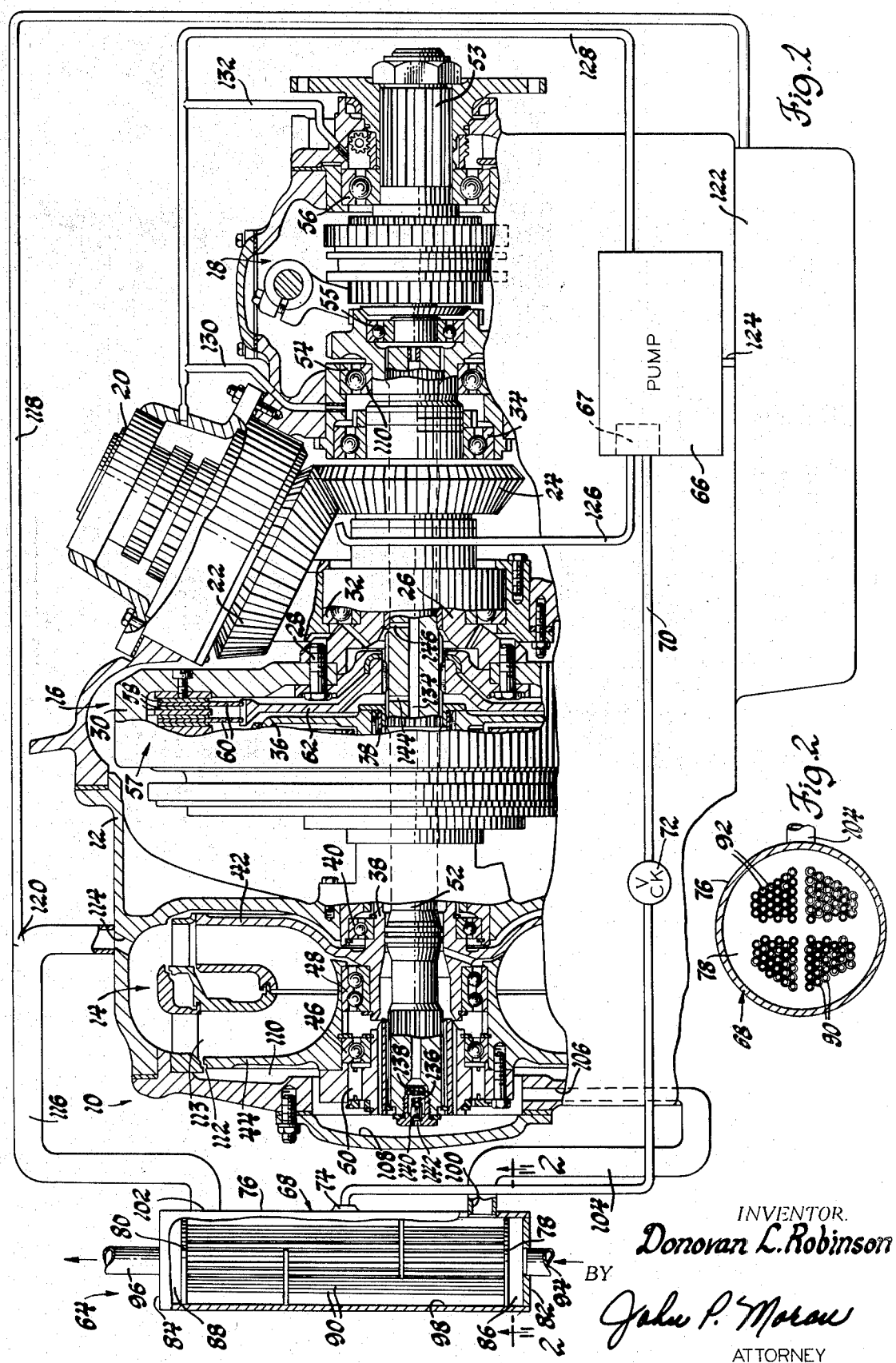

FLUID COOLING SYSTEM

This invention relates to fluid cooling systems and more particularly to an improved cooling system for cooling lubricating fluid and torque multiplication fluid for use in a transmission.

Heretofore, fluid supplied by a fluid pump to a torque converter has been pumped by the torque converter through a cooling system, such as a water-cooled heat exchanger, wherein the fluid is cooled prior to recirculation through the torque converter. However, during direct or "lock-up" drive, the torque converter is not operative, and the fluid which is supplied by the fluid pump for lubrication purposes is no longer cooled prior to entering the transmission. This invention provides, where there is a need, a cooling system which is operative during all phases of transmission operations, for cooling, lubricating and /or torque multiplication fluid regardless of whether the torque converter is operative at a particular time.

A primary object of the invention is to provide an improved fluid cooling system which is operative during both converter drive and direct drive phases of transmission operation.

Another object of the invention is to provide a fluid cooling system wherein fluid supplied by a fluid pump to the torque converter and various lubricating areas of the transmission is cooled prior to entry therein and available in the cooled state independent of the operation of the torque-converter pump.

A further object of the invention is to provide a fluid cooling system wherein a fluid pump supplies fluid under pressure to a central portion of a heat exchanger and thence through the heat exchanger in one direction to the operating chamber of a torque converter when the torque converter is operative, and through the heat exchanger in either of two directions to the transmission for lubricating various parts thereof when the torque converter is not operative.

Other objects and advantages of the invention will become apparent when reference is made to the following description and accompanying drawings, wherein:

FIG. 1 is a cross-sectional view of a transmission embodying the invention; and

FIG. 2 is a cross-sectional view taken along the plane of the line 2-2 of FIG. 1, as if it were a full round view, and looking in the direction of the arrows.

The transmission assembly 10 illustrated in FIG. 1 includes a housing 12 having operatively mounted therein a hydrodynamic torque converter unit 14, a clutching unit 16, and a manually controllable, slidable gear unit 18 adapted to provide forward direct drive, reverse reduction drive, or neutral or no drive.

A power input shaft 20 is connected by bevel gears 22 and 24 to a sleeve shaft 26 which is secured in any suitable manner, such as by bolts 28, to a clutch drum 30 of the clutching unit 16. The sleeve shaft 26 is rotatably supported on bearings 32 and 34. For converter drive, a converter drive clutch 36 is driven by the drum 30 in the manner described in U.S. Pat. No. 2,889,718 issued in the names of Schjolin et al. on Jun. 9, 1959. The converter drive clutch 36 is splined to a converter input sleeve shaft 38 which is supported on bearings 40 and drives the pump 42 of the torque converter 14. The torque-converter pump 42 hydrokinetically drives the converter turbine 44 which is rotatably supported on bearings 46 and 48 and connected through a one-way drive clutch 50 to the turbine output shaft 52. The turbine output shaft 52 is operatively connected by means of the forward and reverse gearing unit 18 to a final output or lead shaft 53. As indicated in the patent, portions of the gearing unit 18 are rotatably supported on bearings 54 and 55, while the final output shaft 53 is supported on bearings 56, as well as on the bearings 55.

For direct drive, a direct drive clutch unit 57, including discs 58 secured to the drum 30 and discs 60 secured to a clutch hub 62, is engaged in the manner described in the above-mentioned U.S. Pat. No. 2,889,718. Engagement of the discs 58 and 60 causes the drum 30 to drive the clutch hub 62 and to thereby directly drive the turbine output shaft 52 which is splined to the hub 62, and the associated final output shaft 53, while bypassing the torque-converter unit 14.

A lubricant cooling system 64 for use with the transmission assembly 10 includes a fluid pump 66 having a regulating valve 67 incorporated therein, a cooler or heat exchanger 68, and a passage 70 including a one-way check valve 72 permitting flow in a direction away from the fluid pump 66 and communicating between the fluid pump 66 and a centrally located inlet 74 of the heat exchanger 68. The inlet 74 is located centrally of the pressure drop through the heat exchanger cooling passage so that the pressure drop of each path from the inlet 74 to the outlet 100 or the inlet 102 when functioning as an outlet is the same. In a conventional heat exchange with a uniform pressure drop, inlet 74 would be halfway between the inlet and the outlet.

The heat exchanger 68 includes an outer casing 76, headers or end support plates 78 and 80 secured within the casing 76 apart from end covers 82 and 84 of the heat exchanger 68, so as to form end chambers 86 and 88, respectively, therewith. A plurality of tubes 90 are secured at their open ends to the headers 78 and 80, forming a labyrinth flow-path around their outer surfaces between the headers 78 and 80 and terminating in a plurality of openings 92 (FIG. 2) in each of the headers 78 and 80, permitting communication between the end chambers 86 and 88 through the tubes 90. A water inlet 94, from the radiator or engine cooling system (not shown), is formed in the end cover 82, communicating with the chamber 86, and a water outlet 96 is formed in the other end cover 84 for returning the water to the radiator, the water flowing through the tubes 90 from the chamber 86 to the chamber 88.

The space of labyrinth flow-path surrounding the tubes 90 between the headers 78 and 80 forms a chamber 98 which receives the fluid lubrication medium from the fluid pump 66 via the line 70 and the centrally located inlet 74. An outlet port 100 from the chamber 98 is formed in the casing 76 adjacent the header 78. Another port 102, serving at times as an inlet port into the chamber 98 and at times as an outlet port therefrom, is formed in the casing 76 adjacent the other header 80. It may be noted that any fluid flowing from the inlet 74 to either the port 100 or 102 will be exposed to an equal cooling length along the water-cooled tubes 90, for a purpose to be described.

A line or conduit 104 communicates between the outlet port 100 and an inlet port 106 leading into a chamber 108 formed in the inlet end of the transmission assembly 10. A passage 110 communicated between the chamber 108 and an inlet 112 into the operating chamber 113 of the torque-converter unit 14. An outlet 114 from the torque converter 14 is formed in the transmission housing 12. When operative, the converter pump 42 provides a centrifugal pressure head between the fluid inlet 112 to the working chamber 113 and the fluid outlet 114 from the working chamber 113.

A second line or conduit 116 communicates between the torque-converter outlet 114 and the port 102 formed in the heat exchanger 68. A return line 118, including an air-bleed and fluid-flow restriction or converter exhaust 120, communicates between the line 116 and a sump 122, the latter being connected to the fluid pump 66 by a line 24. Additional lines 126 and 128, and branch lines 130 and 132 communicate between the fluid pump 66 and the bevel gears 22 and 24, the input shaft 20, and the bearings 34, 54 and 56. A central passage 134 is formed through the turbine output shaft 52, communicating with the chamber 108 formed in the converter end of the transmission housing 12. A check valve 136 is urged by a spring 138 against a seat 140 formed in a port 142 between the central passage 134 and the chamber 108. The central passage 134 serves as an exhaust from the torque converter 14, along with the exhaust 120, and communicates lubricant from the chamber 108 to the bearing 55 in the slidable gear unit 18 and, via branch passages 144 and 146 to the discs or plates 58 and 60 of the direct drive clutch 57 and to the bearing 32 around the sleeve shaft 26.

OPERATION

Fluid is supplied by the fluid pump 66 via the line 70 to the inlet 74 into the heat exchanger chamber 98, wherein it is cooled and transmitted via the line 104 to the inlet port 106 into the chamber 108 and thence to the torque-converter unit 14. While in torque-converter drive, i.e., while the converter drive clutch 36 is engaged, the torque-converter pump 42 provides a centrifugal pressure head between the inlet 112 and the outlet 114, thereby pumping the fluid through the outlet 114 and the conduit or line 116 to the inlet port 102 of the heat exchanger 68 for cooling and recirculation. The coolant, water from the radiator or engine cooling system (not shown), enters the end chamber 86 of the heat exchanger 68 via the water inlet 94, from whence it flows through the openings 92 (FIG. 2) into the parallel tubes 90, to the chamber 88 at the other end thereof, and thence to the outlet 96 for return to the engine radiator.

During torque-converter drive, some of the fluid supplied by the fluid pump 66 leaves the converter system 14 circuit through the check valve 136 and the central passage 134 to lubricate the clutches 36 and 57 and the gearing unit bearing 55. Some fluid also will leave through the air-bleed and fluid-flow restriction 120 and return via the line 118 to the sump 122. The fluid pump 66, thereupon, continually supplies a like volume of "makeup" fluid to the cooler 68 and torque converter 14 circuit.

As indicated above, when the transmission 10 is shifted to direct drive, the torque-converter pump 42 is not driven and the turbine 44 is also not driven, since the one-way or free-wheel clutch 50 permits the turbine output shaft 52 to overrun the turbine 44. Hence, there is no circulation provided by the stationary torque converter 14 through the heat exchanger 68 during direct or "lock-up" drive. However, by virtue of the line 70 from the fluid pump 66 being connected to the central inlet 74 leading into the chamber 98 of the heat exchanger 68, a supply of cooled lubricating fluid will be available to flow under pressure from the central inlet 74 to the ports 100 and 102, the latter port 102 now serving as an outlet the same as the port 100. Normally, the downstream restrictions are such that there is about equal flow in both paths in opposite directions from the central inlet 74. Even though a change in the relative restriction of the paths would change the relative volumes of flow, there would always be some flow through both paths to exhaust ports 120 and 142 and all the fluid would flow through a path of half of the length of the heat exchanger 68. Hence, there is full makeup flow through half of the heat exchanger which provides sufficient cooling when the converter is not driving.

As indicated above, the fluid pump 66 also supplies fluid for lubrication purposes via the line 126 to the tooth-contact area of the bevel gears 22 and 24, and via the line 128 and branch lines 130 and 132 to the transmission bearings 34, 54, 55 and 56, and to the input shaft 20. It may be realized that the fluid in the sump 122 is maintained at a lower temperature by virtue of the heat exchanger 68 continually cooling the fluid prior to its return to the sump 122 and, thereby, limiting the heat rise throughout the system. Accordingly, any fluid in the lines 126 and 128 will already have been cooled and need not be routed through the cooler 68 en route to the bevel gears, input shaft and various bearings, in order to function satisfactorily.

It should be apparent that the invention provides improved means for cooling fluid prior to its being supplied to a transmission for both torque multiplication and lubrication purposes, independent of the operation of the torque converter, thereby eliminating the possibility of heating problems during direct drive.

While but one embodiment of the invention has been shown and described, other modifications thereof are possible.

I claim:

1. In a transmission; an input, and an output; heat exchanger means having a fluid inlet and a fluid outlet with a fluid cooling passage therebetween having a pressure drop and a central inlet connected to said passage centrally of the pressure drop in said passage; drive means connecting said input and output having torque-converter drive means having a fluid operating chamber with an inlet port connected to said fluid outlet, an outlet port connected to said fluid inlet and an exhaust port to exhaust fluid from the torque-converter drive means, and selectively operable to provide a drive between said input and output and during such drive to circulate operating fluid in said chamber from said inlet port to said outlet port and through said cooling passage from said fluid inlet to said fluid outlet and inlet port; additional drive means selectively operable to provide another drive between said input and output bypassing and relieving said torque-converter drive means of said torque-converter drive and reducing the circulation of fluid through said operating chamber; and source means receiving fluid from said exhaust port and delivering fluid under pressure to said central inlet for circulation through at least one of the halves of said fluid cooling passage to said fluid inlet and said fluid outlet and return to said exhaust port.

2. The device described in claim 1, wherein said circulation of fluid through said operating chamber resulting from said torque converter having been bypassed is negligible, and said circulation resulting from the operation of said source means is in opposite directions through both halves of said fluid cooling passage.

3. A transmission comprising an input, an output, a first torque-transmitting means including a torque converter for at times connecting said input to said output, said torque converter including an inlet, an outlet and an exhaust, a second torque-transmitting means including mechanical means for at times directly connecting said input to said output, a heat exchanger, a centrally located inlet port formed in said heat exchanger, second and third ports formed in said heat exchanger at opposite ends thereof, a plurality of tubes in said heat exchanger forming a labyrinth path around the outside surfaces of said tubes between said second and third ports, a fluid pump for supplying fluid under pressure through a first passage to said central inlet port, a second passage between said second port and said outlet from said torque converter, and a third passage between said third port and said inlet into said torque converter, said torque converter when operative providing a centrifugal pressure head between said inlet and said outlet for recirculating said fluid through said heat exchanger, and said fluid pump forcing said fluid through at least one-half of said labyrinth path to said exhaust when said torque converter is inoperative and supplying makeup fluid at all times to replace fluid flowing through said exhaust.

4. A fluid cooling system for use in a transmission having a power input shaft, an output shaft, an intermediate shaft for transmitting torque from said power input shaft to said output shaft, first torque-transmitting means for at times connecting said intermediate shaft to said power input shaft through one torque path, second torque-transmitting means for at times connecting said intermediate shaft to said power input shaft through a second torque path, said cooling system comprising a fluid torque converter, said fluid torque converter being operable in only one of said torque paths, a water-cooled heat exchanger, fluid pump means for supplying fluid under pressure to said heat exchanger and thence at times to said torque converter through one fluid-flow path for torque multiplication use thereby when the torque converter is operative, and at all times to said transmission through at least one of two fluid-flow paths for lubrication purposes regardless of which torque path is operative, said heat exchanger serving to cool said fluid received under pressure from fluid pump prior to entry into any of said fluid-flow paths.

5. The system described in claim 4, and means operatively connected to said fluid-flow paths for communicating said cooled fluid for lubrication purposes to said first and second torque-transmitting means during all operational phases.

6. A fluid cooling system for use in a transmission having a power input shaft, an output shaft, an intermediate shaft for transmitting torque from said power input shaft to said output shaft, first torque-transmitting means for at times connecting said intermediate shaft to said power input shaft through one torque path, second torque-transmitting means for at times connecting said intermediate shaft to said power input shaft through a second torque path, said cooling system comprising a fluid torque converter, said fluid torque converter being operable in one of said torque paths, a water-cooled heat exchanger, an inlet into a central chamber of said heat exchanger, fluid pump means for supplying fluid under pressure to said inlet, outlet and passage means for at times communicating said fluid from said central chamber to said torque converter through one fluid-flow path for torque multiplication and lubrication purposes when the torque converter is operative, and to said transmission through at least one of two fluid-flow paths for lubrication purposes when said torque converter is inoperative, said heat exchanger serving to cool all of said fluid received under pressure from said fluid pump prior to entry into said fluid-flow paths.

7. A fluid cooling system for use in a transmission having a power input shaft, a shiftable gear unit, an intermediate shaft for transmitting torque from said power input shaft to said gear unit, first torque-transmitting means including a first clutch for at times connecting said intermediate shaft to said power input shaft through one torque path, second torque-transmitting means including a second clutch for at times connecting said intermediate shaft to said power input shaft through a second torque path, said cooling system comprising a fluid torque converter, said fluid torque converter being operable in one of said torque paths, a heat exchanger, means for flowing water through said heat exchanger, fluid pump means for supplying fluid under pressure, first passage means communicating between said fluid pump means and said heat exchanger, second passage means communicating between said heat exchanger and said torque converter for supplying fluid thereto for torque multiplication purposes when said torque converter is operative, third passage means formed axially through said intermediate shaft and communicating between said second passage means and said first and second clutches and said shiftable gear unit for lubrication thereof throughout all transmission operations, and one-way check valve means operatively connected to said third passage means, the fluid being cooled by said water in said heat exchanger prior to entry into said torque converter and through said one-way check valve means.

8. The system described in claim 7, and a sump operatively connected to said fluid pump means, and fourth passage means for returning said cooled fluid to said sump.

PO-1050
(5/69)

UNITED STATES PATENT OFFICE
CERTIFICATE OF CORRECTION

Patent No. __3,566,999__      Dated __March 2, 1971__

Inventor(s) __Donovan L. Robinson__

It is certified that error appears in the above-identified patent and that said Letters Patent are hereby corrected as shown below:

Column 1, line 66, "lead"   should read -- load --

Column 2, line 48, "communicated"

should read -- communicates -- line 61, "24"   should read -- 124 --

Column 4, line 68, after "from" insert -- said --

Signed and sealed this 2nd day of May 1972.

(SEAL)
Attest:

EDWARD M. FLETCHER, JR.
Attesting Officer

ROBERT GOTTSCHALK
Commissioner of Patents